(12) United States Patent
Overton et al.

(10) Patent No.: US 6,321,014 B1
(45) Date of Patent: Nov. 20, 2001

(54) METHOD FOR MANUFACTURING OPTICAL FIBER RIBBON

(75) Inventors: Bob James Overton, Lenoir; Peter R. Stupak, Granite Falls; Michael B. Purvis, Hickory; Robert W. Greer; Houching Michael Yang, both of Conover, all of NC (US)

(73) Assignee: Alcatel, Paris (FR)

(*) Notice: Subject to any disclaimer, the term of this patent is extended or adjusted under 35 U.S.C. 154(b) by 0 days.

(21) Appl. No.: 09/431,082

(22) Filed: Nov. 1, 1999

(51) Int. Cl.⁷ .................................................. G02B 6/44
(52) U.S. Cl. ......................................... 385/114; 385/128
(58) Field of Search .................................. 385/123–128, 385/141–145, 114

(56) References Cited

U.S. PATENT DOCUMENTS

| | | |
|---|---|---|
| 4,096,010 | 6/1978 | Parham et al. . |
| 4,390,589 | 6/1983 | Geyling et al. . |
| 4,426,129 | 1/1984 | Matsumura et al. . |
| 4,592,932 | 6/1986 | Biswas et al. . |
| 4,767,183 | 8/1988 | Martin . |
| 4,980,007 | 12/1990 | Ferguson . |
| 5,218,009 * | 6/1993 | Rutsch et al. ............... 522/16 |
| 5,219,623 | 6/1993 | Petisce . |
| 5,268,984 | 12/1993 | Hosoya et al. . |
| 5,583,164 | 12/1996 | Jochum et al. . |
| 5,780,117 | 7/1998 | Swartz et al. . |
| 5,845,034 | 12/1998 | Petisce . |
| 5,904,883 | 5/1999 | Hattori et al. . |
| 5,908,873 | 6/1999 | Shustack . |
| 5,919,944 | 7/1999 | Eldin . |
| 5,933,559 | 8/1999 | Petisce . |
| 5,945,173 | 8/1999 | Hattori et al. . |

FOREIGN PATENT DOCUMENTS

| | | |
|---|---|---|
| 0 780 712 A2 | 6/1997 | (EP) . |
| 0849 296 A2 | 6/1998 | (EP) . |
| 0 879 804 A1 | 11/1998 | (EP) . |
| 63156042 * | 6/1988 | (JP) . |
| 10338552 * | 12/1998 | (JP) . |
| WO 90/13579 | 11/1990 | (WO) . |
| WO-90/13579 * | 11/1990 | (WO) . |
| WO 97/05515 | 2/1997 | (WO) . |
| WO-97/05515 * | 2/1997 | (WO) . |
| WO 97/09648 | 3/1997 | (WO) . |

OTHER PUBLICATIONS

Patent Abstracts of Japan, Publication No. 10338552; Dec. 22, 1998; Shuichi.
Patent Abstracts of Japan, Publication No. 08310841, Nov. 26, 1996; Nobuhiro.
Patent Abstracts of Japan, Publication No. 63156042; Jun. 29, 1988; Tamotsu.
Patent Abstracts of Japan; Publication No. 01183434; Jul. 21, 1989; Hiroaki.

* cited by examiner

Primary Examiner—Rodney Bovernick
Assistant Examiner—Michelle R. Connelly-Cushwa
(74) Attorney, Agent, or Firm—Sughrue, Mion, Zinn, Macpeak & Seas, PLLC

(57) ABSTRACT

A method for manufacturing optical fiber ribbon containing optical fibers having colored layers. The color is provided in a secondary coating composition that is cured prior to application of a matrix material for forming the optical fiber ribbon. The secondary coating composition includes a photoinitiator that is relatively insensitive to oxygen, and the environment to which the secondary coating composition is exposed is limited by removing the boundary layer of air surrounding the secondary coating composition prior to the application of the matrix material thereto.

28 Claims, 1 Drawing Sheet

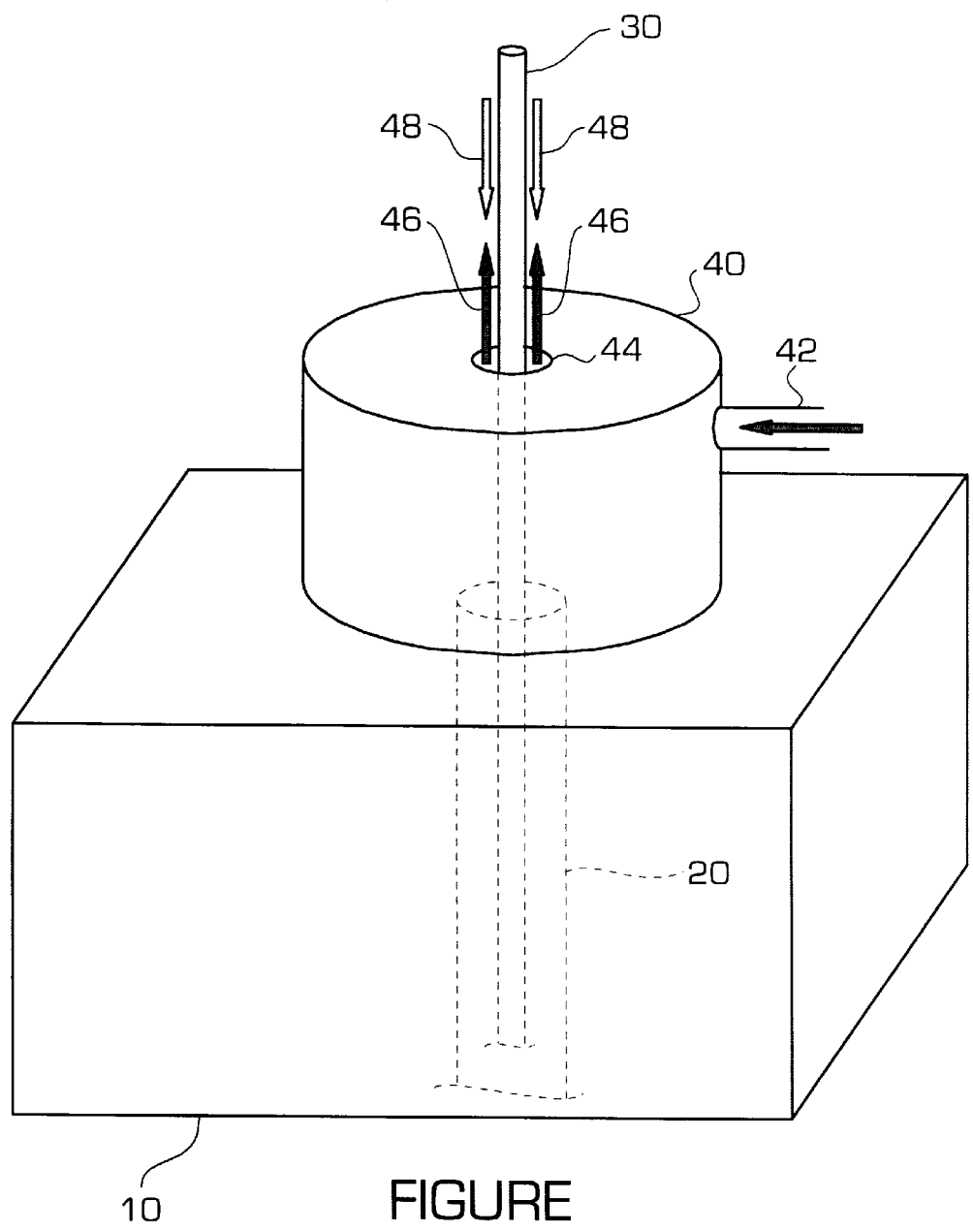
FIGURE

METHOD FOR MANUFACTURING OPTICAL FIBER RIBBON

BACKGROUND OF THE INVENTION

1. Field of the Invention

The invention relates to methods for manufacturing optical fiber ribbon and, more specifically, methods for manufacturing optical fiber ribbon containing optical fibers having coatings applied when the fibers are first drawn, the coatings being colored by the incorporation of a coloring agent, the methods advantageously avoiding a separate inking step and avoiding waste.

2. Description of the Related Prior Art

In conventional optical fiber ribbon, coated optical fibers usually in counts of four, eight or twelve fibers, are arranged in parallel and bundled together by a radiation-curable matrix material. Each fiber contains a primary coating and a secondary coating. The primary coating, which is applied directly onto the glass, is formulated to give a coating of low modulus and $T_g$ (glass transition temperature) in order to buffer the fiber from stresses that induce microbending of the fiber. The secondary coating is designed to have a higher modulus and $T_g$ to provide solvent and abrasion resistance.

The first step in the production of optical fiber ribbon includes the selection of appropriate optical fibers taking into consideration any relevant criteria and especially the coated diameter of the fibers. The coated fibers are then further coated, usually off-line, with an ink layer, typically 1 to 5 microns in thickness. That is, the fibers having the primary and secondary coatings thereon are removed from the spool and coated with an ink layer which is usually a radiation-curable coating composition containing a pigment system for color. The ink coating layer is then cured, and the,optical fiber having the primary, secondary and ink coating layers thereon is placed on a spool. The desired number of fibers coated in this manner are then placed on a so-called "payoff tree" which is an apparatus including one or more wheels that feed out the fibers in a manner whereby the tension in each fiber is controlled using a system of pulleys.

Following payoff from the spools, the coated fibers in the desired number are arranged in a flat plane, in a manner whereby they are just touching. The fibers are then encapsulated in a radiation-curable matrix material by passing the fibers through a first slit-shaped matrix die after which a liquid matrix material, usually a urethane acrylate material, is applied to the fibers. After passing through a second slit-shaped matrix die to remove excess matrix material, the fibers having the liquid matrix material applied thereto are subjected to actinic-radiation to cure the matrix material. The optical fiber ribbons are then placed on a spool, usually in 25 km lengths.

The application of the ink layer in a separate inking step is disadvantageous because it is costly. Additionally, in the conventional manner of applying the ink coating, lumps in the ink coating sometimes occur which causes variations in the thickness of the ink coating and breakage of the fiber. Also, matching the overall fiber diameters for a set of 4 to 12 fibers with different colored ink coatings is often difficult because of variations that occur in the thickness of the ink coating.

SUMMARY OF THE INVENTION

Accordingly, an object of the invention is to provide an improved method for preparing optical fiber ribbon whereby the need for a separate step for coating the optical fibers of the ribbon with an ink coating layer is eliminated.

Another object of the invention is to provide improved optical fiber ribbons containing colored optical fibers, the optical fiber ribbons being prepared without a separate inking step and including a colored secondary coating, the secondary coating and matrix material being substantially unreacted together.

These objectives and other objectives are achieved by providing a method for manufacturing optical fiber ribbon including coating a plurality of optical fibers with a primary coating composition and curing the primary coating composition to form a primary coating layer on the optical fibers. The optical fibers having the primary coating layer thereon are coated with a secondary coating composition containing pigments, dyes, and/or a colored reactive component in an amount effective for inking the optical fibers, and a photoinitiator in an amount effective for coloring initiating curing of the secondary coating composition upon exposure to actinic radiation. The preferred photoinitiator is insensitive to the free-radical quenching effects of oxygen. The oxygen adjacent said secondary coating composition is substantially eliminated and the bulk and surface of the secondary coating composition are at least substantially completely cured. The optical fibers having the primary coating layer and the secondary coating layer thereon are encapsulated with a matrix material. The encapsulation is conducted while the secondary coating composition is at least substantially completely cured, whereby the matrix material and the secondary coating are adjoining but substantially unreacted with each other.

An optical fiber ribbon is also provided. The optical fiber ribbon includes a plurality of optical fibers each of which has a primary coating layer and a secondary coating layer. The secondary coating layer is prepared from a secondary coating composition colored as described above. A matrix material encapsulates the optical fibers having the primary and secondary coating layers thereon. The matrix material and the secondary coating layer are adjoining but substantially unreacted with each other.

BRIEF DESCRIPTION OF THE DRAWING

Other features and advantages of the present invention will come apparent when the following description is read in conjunction with the accompanying drawing, in which:

The FIGURE is a partial schematic view of an irradiator apparatus that may be utilized in the present invention.

DETAILED DESCRIPTION OF THE PREFERRED EMBODIMENTS

The present invention provides an improved method for preparing optical fiber ribbon that advantageously eliminates the need for a separate inking of the optical fibers of the ribbon. In accordance with the present invention, the optical fibers of the ribbon are coated with a primary and secondary coating, the latter of which contains a coloring agent for coloring the optical fibers. Additionally, in contrast to conventional secondary coatings of optical fibers, the bulk and surface of the secondary coating containing the coloring agent are completely or substantially completely cured prior to application of the matrix material. This is achieved by the use of a photoinitiator that is relatively insensitive to oxygen, and by limiting the amount of oxygen present in the environment in which the secondary coating is exposed to actinic radiation. In this manner, a method for preparing optical fiber ribbon is provided whereby separate offline application of an inking coating is eliminated. In accordance with the present invention, the optical fibers coated with the primary and secondary coatings may advantageously be fabricated directly into optical fiber ribbon without any intervening treatment.

As used herein, the term "coloring agent" is defined as including pigments, dyes and any other suitable material presently known or developed in the future for imparting color to the secondary coating.

The primary coating of the optical fibers of the ribbons in accordance with the present invention may be any suitable primary coating composition and may be applied and cured in any suitable conventional manner. For example, the primary coating composition may comprise a urethane di-acrylate oligomer of a relatively higher molecular weight (circa 5000 grams/mole) with viscosity lowered by the addition of functionalized, reactive monomer diluents, an adhesion promoter, a photoinitiator, and stabilizers. An example of such a primary coating formulation follows:

TABLE I

| Ingredient | Parts by Weight |
|---|---|
| Aliphatic urethane acrylate oligomer with saturated hydrocarbon backbone | 55.00 |
| Lauryl acrylate monomer | 14.5 |
| Hydroxycyclohexylphenyl ketone photoinitiator | 6.00 |
| Octyldecyl-3-(3',5'-di-tert-butyl-4'hydroxy)hydrocinnamate stabilizer | 1.50 |
| Octadecyl-3-mercaptopropionate chain transfer agent | 2.75 |
| Gamma-mercaptopropyl trimethoxy silane adhesion promoter | 0.75 |
| Propylene glycol nonylphenyl ether acrylate | 19.50 |

Illustrative primary coating compositions are disclosed in U.S. Pat. Nos. 5,352,712; 4,639,080; and 5,146,531, the disclosures of which are incorporated herein by reference. Suitable primary coating compositions are available from, for example, Borden, Inc., 630 Glendale Milford Rd., Cincinnati, Ohio, 45215. Other suitable primary coating compositions will be apparent to one skilled in the art.

The secondary coating of the optical fibers used in the ribbons in accordance with the present invention may also be any suitable secondary coating composition, provided the secondary coating composition contains a coloring agent that provides the necessary color-coding identification for the fiber, and provided the secondary coating composition includes a photoinitiator that is at least substantially insensitive to oxygen. As used herein, the term "photoinitiator that is at least substantially insensitive to oxygen" is defined as a photoinitiator that achieves, in the presence of an atmosphere containing about 9 percent oxygen or less in the irradiating chamber, the secondary coating cure levels described herein. That is, the photoinitiator is insensitive to the free-radical quenching effects of oxygen.

A photoinitiator is used in the present invention in order to obtain complete or substantially complete curing of both the bulk and the surface of the secondary coating composition prior to application of the matrix material to the fibers to prepare the optical fiber ribbon. As used herein, the term "substantially complete curing of the secondary coating composition" is defined as preferably at least about 90% curing of this layer, more preferably at least about 92% curing of this layer, and most preferably at least about 95% curing of this layer as determined by the method described herein. While not wishing to be bound by theory, it is believed that with a conventional free radical-type photoinitiator, the presence of oxygen inhibits polymerization especially at the surface of the secondary coating. Specifically, it is believed that the presence of oxygen inhibits decomposition of the photoinitiator into free-radical containing fragments and the propagation of the polymerization.

The secondary coating composition may, for example, be a urethane acrylate oligomer of relatively lower molecular weight (circa 1000 grams/mole) that contains cyclic structures in the molecular backbone for added stiffness, with viscosity lowered by appropriate reactive diluents, a photoinitiator and a stabilizer, additionally formulated to include colorants of the types listed above. An example of such a formulation is:

TABLE II

| Ingredient | Parts by Weight |
|---|---|
| Urethane methacrylate oligomer | 68.4 |
| Isobornyl acrylate diluent | 14.4 |
| n-vinyl pyrrolidone | 15.4 |
| Lucirin LR 8728 photoinitiator | 1.5 |
| Irganox 1035 stabilizer | 0.3 |

Illustrative secondary coating compositions that may be additionally formulated to include pigment in accordance with the present invention are disclosed in U.S. Pat. No. 5,787,218 the disclosure of which is incorporated herein by reference. Suitable secondary coating compositions containing pigment and an oxygen insensitive photoinitiator are available from, for example, DSM Desotech, 1122 St. Charles Street, Elgin, Ill., 60120.

Preferably, the secondary coating has a substantially uniform thickness around the primary coating. Furthermore, the secondary coating preferably has a thickness of at least about 2 $\mu$m, more preferably about 3 $\mu$m to 30 $\mu$m.

The coloring agent present in the secondary coating in accordance with the present invention may be any suitable coloring agent including pigment dyes and the like conventionally used in a separate ink coating. Typical pigments may be either organic or inorganic in substance, for example, titanium oxides, azo yellows, perylene red compounds and phthalocyanine greens and blues, blended to produce the desired lightness, hue and chroma of a color. Other suitable coloring agents will be apparent to one skilled in the art. The science of pigments is mature and well-described in extant literature.

Preferably, the coloring agent is a pigment system of finely divided particles with a particle size distribution excluding particles >5 microns in diameter. More preferably, the coloring agent is a pigment system of finely divided particles with a particle size distribution excluding particles >1 micron in diameter.

As mentioned above, in accordance with the present invention, the photoinitiator included in the secondary coating composition is relatively insensitive to oxygen. For example, the photoinitiator used in the secondary coating composition in accordance with the invention may be of the acyl phosphine oxide family. Illustrative photoinitiators suitable for use in the secondary coating composition in accordance with the present invention are disclosed in U.S. Pat. Nos. 5,837,750 and 5,416,880, the disclosures of which are incorporated herein by reference. Suitable photoinitiators for use in the secondary coating composition in accordance with the present invention include (2,4,6-trimethylbenzoyl) diphenylphosphine oxide (Lucirin TPO available from BASF), and bisacylphosphine oxide (for example, Irgacure 819 available from Ciba Specialty Chemicals). Other acyl phosphine oxides useful in the present invention for curing the secondary coating include bis(2,6-dimethoxybenzoyl)-2,4,4-trimethylpentylphosphine oxide, bis(2,6-dimethoxybenzoyl)-phenylphosphine oxide, bis(2,4,6-trimethylbenzoyl)-phenylphosphine oxide, bis(2,4,6-trimethylbenzoyl)-2,4,4-trimethylpentylphosphine oxide, tris(benzoyl)phosphine oxide, tris(2-methylbenzoyl) phosphine oxide, tris(2,6-dimethylbenzoyl)phosphine oxide, tris(2,4,6-trimethylbenzoyl)phosphine oxide, tris(2-methoxybenzoyl)phosphine oxide, and the like. Preferably, the photoinitiator is present in the secondary coating composition in accordance with the present invention in an amount of 0.1 to 10% by weight, more preferably about 0.1 to 6% by weight, and most preferably about 0.5 to 3% by weight, based upon the weight of the total formulation. Other suitable photoinitiators for the secondary coating composition in accordance with the present invention will be apparent to one skilled in the art.

The secondary coating composition in accordance with the present invention may be applied to the optical fibers having the primary coating layer thereon in any suitable conventional manner.

Also, in accordance with the present invention, the amount of oxygen present in the environment that the secondary coating is exposed to prior to the encapsulation of the fibers with matrix material and especially during curing of the secondary coating, is limited. This is because it is believed that, while the photoinitiator is relatively insensitive to oxygen, the presence of oxygen still inhibits the propagation of the polymer chain produced during the curing of the secondary coating composition. Specifically, a stripping device is used in the method of the present invention to substantially eliminate the presence of air adjacent the surface of the secondary coating composition during irradiation for curing the secondary coating after it's application. As used herein, the term "substantially eliminate the presence of air" is defined as preferably eliminating at least about 80% of the air, more preferably at least about 90% of the air, and most preferably at least about 95% of the air, particularly the boundary layer air, adjacent the secondary coating composition. That is, the stripping device is used to remove the boundary layer of air present around the secondary coating to the percent discussed above, after it is applied to the optical fiber having a primary coating already coated thereon and while the optical fiber is being cured.

In accordance with the present invention, fiber having the uncured, liquid secondary coating composition applied thereto passes into an irradiator through a small hole, e.g., through an iris closed to a diameter of about 5 mm, exiting at the bottom of the irradiator through a similar aperture. Inside the irradiator, the fiber is protected from the crossflow of air cooling the irradiator bulb by a quartz cylinder, running from entrance to exit of the irradiator, that allows the actinic radiation to reach the fiber. The inserting atmosphere inside the irradiator may be any suitable inert gas including, for example, nitrogen, and is preferably maintained at a pressure higher than the ambient external pressure to further prevent the boundary layer of air surrounding the secondary coating from entering the irradiator. The inerting atmosphere inside the irradiator and, in particular, inside an inert gas distribution chamber as described below, is preferably supplied at a volumetric flow rate sufficient to maintain a volumetric flow rate exiting the irradiator through the iris at the top of the irradiator at a flow rate of about 1 to about 50 liters/minute, more preferably about 1 to about 30 liters/minute, and most preferably about 20 liters/minute.

The exiting inerting atmosphere strips the boundary layer from the coated fiber as it enters the irradiator through the small aperture and the atmosphere adjacent to the coated fiber is replaced with the inert atmosphere of the interior of the protective quartz tube. In this manner, complete or substantially complete curing of the secondary coating containing a coloring agent is achieved. The holes in the irradiator through which the optical fiber having the secondary coating compositions pass have any suitable size that will remove the boundary layer of air surrounding the secondary coating composition. Preferably, the tolerance between the outer edge of the secondary coating composition present on the optical fiber and the edge of the hole is about 3 to about 5 mm, more preferably, about 2 to about 3 mm, and most preferably about 1 mm.

Referring to the figure, a suitable irradiator apparatus for curing the secondary coating in accordance with the present invention includes UV lamp housing 10 provided with a protective quartz cylinder 20 (shown in phantom) through which coated optical fiber 30 passes in a generally downward direction, the UV lamp itself and further apparatus associated with the UV lamp not being shown for simplicity. Inerting gas distribution chamber 40 includes an inlet 42 for inert gas as well as an entrance aperture or orifice 44 for coated optical fiber 30. As described above, a positive pressure may be maintained in housing 10 and, in particular, in chamber 40 relative to the ambient external pressure. Due to this pressure difference, inerting gas exits orifice 44 of chamber 40, as shown by the arrows 46 and effectively strips the oxygen containing air boundary layer shown as arrows 48 from coated optical fiber 30.

In the irradiator, the secondary coating composition in accordance with the present invention is subjected to actinic radiation after it passes through the holes in the manner discussed above, in any suitable conventional manner.

As discussed above, complete curing of the surface of the secondary coating composition is contrary to conventional optical fiber manufacture where complete curing of the surface is generally avoided in order to facilitate ease of winding of the fiber at draw and in subsequent handling.

After the secondary coating composition is cured or substantially cured in accordance with the present invention as described above, a conventional matrix material is applied thereto. The matrix material may be any of the known thermoplastic or thermoset materials that cure upon exposure to actinic radiation. Illustrative matrix materials include matrix material 9MKU73055 available from Borden Chemical, Cincinnati, Ohio. For example, the matrix material may be material comprising an aliphatic urethane acrylate oligomer, reactive monomer, a release agent and optionally a photoinitiator. Suitable matrix materials as well as methods for applying matrix material are described in U.S. Pat. No. 5,908,873, the disclosure of which is incorporated herein by reference. Of course, other suitable matrix materials in addition to those discussed above will be apparent to one skilled in the art.

In accordance with the present method for producing optical fiber ribbon containing inked optical fiber, a separate ink coating operation is avoided. The secondary coating composition in accordance with the present invention is provided with coloration by use of pigments, dyes, and the like including combinations thereof, and performance of the ribbon production is greatly improved by processing the optical fiber having the primary and secondary coatings thereon directly into ribbon with no intervening coloring or processing stage. Also, performance of the optical fiber ribbon itself is improved by the elimination of an extra interface, i.e., the interface between the secondary coating and the ink coating layer. That is, in accordance with the present invention, the secondary coating and the matrix material are advantageously adjoining, i.e., in contact with each other, but the secondary coating layer and the matrix material do not react together to form a substantial bond, the secondary coating composition having been at least substantially completely cured prior to the encapsulation with the matrix material. As used herein, the term "substantially unreacted with each other" used in connection with the matrix material and secondary coating composition, is characterized by the performance attribute that the matrix material may be peeled substantially as a film, without tearing, from one side of the planar-arranged plurality of fibers forming the substrate of the ribbon.

The invention is characterized by being resistant to stresses that "pinch" the ribbon edge-to-edge, such that the matrix material does not debond from the plurality of fibers. The ribbon may be subjected to a twist of 720 degrees over a length 6 inches without debonding the matrix from the plurality of fibers. Additionally, the matrix material may be removed in one piece from one side of the planar arrangement of the fibers by use of an adhesive peel board commonly used by craftsmen in the field for this purpose. Further, the invention is characterized by being resistant to attenuation increase on immersion in water, that is there is limited increase in attenuation of the transmitted signal. Specifically, the ribbon with 4, 8 or 12 fibers may be immersed in 60° C. water for 30 days with none of the fibers increasing in attenuation by as much as 1 dB/km. The ribbon with 4, 8 or 12 fibers may be immersed in 23° C. water for 30 days with none of the fibers increasing in attenuation by as much as 0.05 dB/km.

The invention is further illustrated by the following example which is set forth by way of illustration only and not by way of limitation.

EXAMPLE

Singlemode optical fiber is drawn down to a diameter of 125 microns, cooled, and coated with a 30 micron layer of a urethane-acrylate primary coating formulation in a coating applicator partway down a standard draw tower. The primary-coated fiber enters an irradiator having a source of actinic radiation oriented in parallel with the fiber path and in one focus of a set of elliptical reflectors. The path of the primary-coated fiber is through the second focus of the ellipse formed by the radiation reflectors. The primary coating on the fiber is partially cured to and above the gelling point of the liquid coating in the irradiator.

The fiber having the now-partially cured primary coating enters another coater where a 30 micron layer of a pigmented secondary coating is applied. The pigmented secondary coating containes a combination of acyl phosphine oxide and bis-acyl phosphine oxide photoinitiators, that is, Lucirin TPO (available from BASF) and Irgacure 819 (available from Ciba Specialty Chemicals) in a 50:50 weight ratio, the photoinitiator being present in a total concentration of approximately 3 percent by weight based upon the total weight of the secondary coating composition. The dual-coated fiber enters another irradiator, the first of a set of three irradiators arrayed sequentially in the fiber path to cure the secondary coating and complete cure of the primary coating. These irradiators, like that used to cure the primary coating, provided protection for the fiber from the crossflow of cooling air by a quartz center tube surrounding the fiber path through each of the irradiators. The quartz center tubes are supplied with an inerting atmosphere of nitrogen. The entrance of the first irradiator is restricted by an iris to a diameter of 3 mm. Further the inerting atmosphere is supplied to the interior of the center tubes with a volumetric flow rate such that the flow rate of inerting atmosphere exiting through the entrance of the first irradiator is about 20 liters/minute. The restriction of the entrance to the first irradiator in the array combined with the outflow of inerting atmosphere from the slightly pressurized interior of the lamps strips away the boundary layer of atmospheric composition, replacing it with pure nitrogen.

The dual coated fiber is taken up on a receiving drum at the base of the draw tower. The coatings on the fiber are found to be substantially fully cured by the FTIR measurement method described below.

In the same way, 12 colors of dual coated optical fiber are produced, all fibers having the secondary coating substantially fully cured as measured by FTIR.

No additional steps are taken to further improve the cure at the surface of the dual coated fiber secondary coating. No ink is applied as the fibers already are colored.

Twelve spools of dual coated optical fiber representing twelve different colors for color-coding are placed onto the spindles of a mechanical pay-off device. This pay-off device is so designed as to allow the controlled and continuous removal of the individual fibers, maintaining a consistent tension of about 30 to 40 grams in each fiber to the end of each fiber of each spool. The fibers are passed around a series of grooved alignment wheels that maintain the order of the fibers, aligned into a parallel and substantially planar array, and positioned so as to be nearly in contact with each other. The substantially planar array of fibers is passed through a die where the fibers are maintained in a further improved alignment and made to come into close contact with each other and where liquid UV curable coating resin matrix material is applied to the fiber array. The substantially planar array of parallel fibers exiting the application die is at least surrounded by a layer of matrix material so that the coated array is uniform in overall dimensions of thickness and width. The coated array is then passes through a source of high intensity UV irradiation that effects the cure of the liquid matrix material surrounding the fibers. The cured fiber array is taken up on a spool continuously during the process. This ribbon manufacturing process can proceed continuously until the initial fiber spools are exhausted of dual coated optical fiber.

A suitable procedure for determining the amount of curing of the secondary coating in accordance with the present invention utilizes Fourier Transform Infrared Spectroscopy (FTIR) to allow the calculation of the content of residual reactive functionality at and near the surface of secondary coating cured on fiber relative to the content of reactive functionality in the liquid coating prepolymer. In the procedure outlined below, the reactive functionality is the acrylate functionality.

FOURIER TRANSFORM INFRARED SPECTROSCOPY PROCEDURE FOR DETERMINING THE AMOUNT OF CURE OF THE SECONDARY COATING 1.0 SCOPE 1.1 This is a FTIR procedure for determining degree of cure of the coating on an optical fiber.

1.2 This method is a measure of the degree of cure at the surface of the coating and to a depth of 1–4 μm.

1.3 The FTIR Attenuated Total Reflectance (ATR) accessory is utilized to examine the coated fiber.

2.0 Equipment/Materials 2.1 ATR crystal, KRS-5, 45°, parallelogram, 10 mm×50 mm×3 mm.

2.2 ATR sampling accessory, 45° mount, with holder.

2.3 Scotch tape 2.4 Scissors 2.5 FTIR Spectrophotometer, e.g., Nicolet 550.

2.6 Resolution of 4 $cm^{-1}$ 3.0 Sample Preparation 3.1 Cut 50 mm lengths of coated optical fiber to be mounted onto the KRS-5 crystal lengthwise.
  a. Lay a 150 mm length of scotch tape on a flat surface, adhesive side up.
  b. Lay a series of 100 mm lengths of fiber side by side onto the tape such that they adhere to the adhesive and are as close together as possible until they form a rectangular area of approximately 10 mm×100 mm.
  c. Cut the fiber bundle in half to obtain two pieces.

4.0 Instrument Set-up 4.1 In optical bench set-up on the FTIR, align the bench.

4.2 Mount the KRS-5 crystal and adjust the its position in the IR beam to obtain the maximum signal.

4.3 With the crystal in the IR beam, collect a background infrared scan.

5.0 Degree of cure on Fibers 5.1 Secure one 10 mm×50 mm fiber array sample onto each side of the crystal making sure that the fibers are in contact with the crystal and that the ends are not blocking the path of the infrared beam into the beveled end of the crystal.

5.2 Mount and scan the sample using 100 scans.

5.3 Clean the KRS-5 crystal and place a drop of liquid coating on one side, smearing the coating to cover approximately ½ of one side of the crystal.

5.4 Mount and scan the sample using 100 scans.

6.0 Calculations 6.1 Measure the net peak area of the acrylate unsaturation absorbance of the liquid coating.
  a. For most acrylate-based coatings, the absorbance of 810 $cm^{-1}$ should be used. 1410 $cm^{-1}$ and 1635 $cm^{-1}$ are also satisfactory.
  b. The net peak area should be measured using the "baseline" technique in which a baseline is drawn tangent to absorbance minima on either side of the peak. The area under the peak and above the baseline is then determined.

6.2 Repeat the above step for the spectrum of the coating on the fiber.

6.3 Repeat step 6.1 for the reference peak on both the liquid and cured coating spectrum.
  6.3.1 This peak must not change in intensity as the coating is cured.
  a. If the 810 $cm^{-1}$ acrylate peak is chosen, most formulations have an absorbance in the 780–750 $cm^{-1}$ region that can be used as the reference.
  b. For each subsequent analysis of the same formulation, the same reference peak, with the same baseline points, must be utilized.

6.4 Determine the ratio of the acrylate absorbance to the reference absorbance for the liquid using the following equation:

$$R_L = A_{AL}/A_{RL}$$

Where $A_{AL}$=area of acrylate absorbance of liquid
$A_{RL}$=area of reference absorbance of liquid
$R_L$=area ratio for liquid coating 6.5 Determine the ratio of the acrylate absorbance to the reference absorbance for the coating on the fiber using the equation:

$$R_F = A_{AF}/A_{RF}$$

Where $A_{AF}$=area of acrylate absorbance on fiber
$A_{RF}$=area of reference absorbance on fiber
$R_F$=area ratio for cured coating on fiber 6.6 Calculate the degree of cure
  6.6.1 percent residual unreacted acrylate (% RUA) using the following equation:

$$\%RUA = (R_L - R_F)/R_L \times 100$$

6.6.2 degree of cure is calculated as 100%−% RUA

Although the present application has been described in connection with a preferred embodiment thereof, many other variations and modifications will become apparent to those skilled in the art without departure from the scope of the invention. It is preferred, therefore, that the present invention not be limited by the specific disclosure herein, but only by the appended claims.

What is claimed is:

1. A method for manufacturing an optical fiber ribbon, comprising the steps of:

coating a plurality of optical fibers with a primary coating composition and curing said primary coating composition to form a primary coating layer on each of said optical fibers;

coating said optical fibers having said primary coating layer thereon with a secondary coating composition, said secondary coating composition containing a coloring agent in an amount effective for color-coding said optical fibers, and a photoinitiator in an amount effective for initiating curing of said secondary coating composition upon exposure thereof to UV radiation, said photoinitiator being substantially insensitive to oxygen;

substantially eliminating oxygen from adjacent said secondary coating composition coated on said optical fibers and at least substantially completely curing of said secondary coating composition; and encapsulating said plurality of optical fibers having said primary coating layer and said secondary coating layer thereon with a matrix material, said encapsulation being conducted while said secondary coating composition is at least substantially completely cured whereby said matrix material and s aid sec ondary coating are adjoining but substantially unreacted with each other.

2. The method according to claim 1, wherein said photoinitiator is an acylphosphine oxide.

3. The method according to claim 1, wherein said photoinitiator is present in said secondary coating composition in an amount of about 0.1 to about 10% by weight based upon the weight of the total formulation.

4. The method according to claim 3, wherein said photoinitiator is present in said secondary coating composition in an amount of about 0.1 to about 6% by weight based upon the weight of the total formulation.

5. The method according to claim 4, wherein said photoinitiator is present in said secondary coating composition in an amount of about 0.5% to about 3% by weight based upon the weight of the total formulation.

6. The method according to claim 1, wherein said coloring agent is a pigment having a particle size distribution that excludes articles larger than 5 microns in diameter.

7. The method according to claim 6, wherein the coloring agent is a pigment having a particle size distribution that excludes particles larger than 1 micron in diameter.

8. The method according to claim 1, wherein said step of substantially eliminating oxygen from adjacent said secondary coating composition comprises removing boundary layer air from adjacent said secondary coating composition while curing said secondary coating composition.

9. The method according to claim 8, wherein said step of removing boundary layer air from adjacent said secondary coating composition comprises passing each of said plurality of optical fibers having said secondary coating composition coated thereon through an aperture having a tolerance with an outer edge of said secondary coating composition whereby said boundary layer air is removed.

10. The method according to claim 9, wherein said aperture is an aperture in an actinic irradiating lamp for at least substantially completely curing said secondary coating composition, said irradiating lamp having an inert atmosphere.

11. The method according to claim 1, wherein said optical fiber ribbon is resistant to stresses that pinch the ribbon edge-to-edge.

12. The method according to claim 1, wherein said optical fiber ribbon is resistant to stresses that pinch the ribbon edge-to-edge, and said matrix material does not debond from said plurality of fibers.

13. The method according to claim 1, wherein said optical fiber ribbon is resistant to stresses that pinch the ribbon edge-to-edge, and said optical fiber ribbon may be subjected to a twist of 720 degrees over a length of 6 inches without debonding said matrix material from said plurality of fibers.

14. An optical fiber ribbon, comprising:
a plurality of optical fibers, each optical fiber having a primary coating layer and a secondary coating layer, said secondary coating layer being prepared from a secondary coating composition containing a coloring agent in an amount effective for color-coding said plurality of optical fibers, and a photoinitiator in an amount effective for initiating curing of said secondary coating composition upon exposure thereof to actinic radiation, said photoinitiator being substantially insensitive to oxygen;
a matrix material for encapsulating said plurality of optical fibers, said matrix material and said secondary coating layer being adjoining but substantially unreacted with each other,
wherein said optical fiber ribbon is resistant to stresses that pinch the ribbon edge-to-edge.

15. The optical fiber ribbon according to claim 14, wherein said oxygen insensitive photoinitiator is an acylphosphine oxide.

16. The optical fiber ribbon according to claim 14, wherein said photoinitiator is present in said secondary coating composition in an amount of about 0.1 to about 10% by weight based upon the weight of the total formulation.

17. The optical fiber ribbon according to claim 16, wherein said photoinitiator is present in said secondary coating composition in an amount of about 0.1 to about 6% by weight based upon the weight of the total formulation.

18. The optical fiber ribbon according to claim 17, wherein said photoinitiator is present in said secondary coating composition in an amount of about 0.5 to about 3% by weight based upon the weight of the total formulation.

19. The optical fiber ribbon according to claim 14, wherein said coloring agent is a pigment having a particle size distribution that excludes particles larger than 5 microns in diameter.

20. The optical fiber ribbon according to claim 19, wherein said coloring agent is a pigment having a particle size distribution that excludes particles larger than 1 microns in diameter.

21. The optical fiber ribbon according to claim 14, wherein said matrix material is curable upon exposure to actinic radiation.

22. The optical fiber ribbon according to claim 14, wherein said matrix material is a thermoplastic or a thermoset material.

23. The optical fiber ribbon according to claim 14, wherein said secondary coating layer has a substantially uniform thickness around said primary coating layer.

24. The optical fiber ribbon according to claim 23, wherein said secondary coating layer has a thickness of at least about 2 $\mu$m.

25. The optical fiber ribbon according to claim 24, wherein said secondary coating layer has a thickness of from about 3 $\mu$m to about 30 $\mu$m.

26. The optical fiber ribbon according to claim 14, wherein said optical fiber ribbon is produced by a method for manufacturing an optical fiber ribbon, comprising the steps of:
coating a plurality of optical fibers with a primary coating composition and curing said primary coating composition to form a primary coating layer on each of said optical fibers;
coating said optical fibers having said primary coating layer thereon with a secondary coating composition, said secondary coating composition containing a coloring agent in a amount effective for color-coding said optical fibers, and a photoinitiator in an amount effective for initiating curing of said secondary coating composition upon exposure thereof to UV radiation, said photoinitiator being substantially insensitive to oxygen;
substantially eliminating oxygen from adjacent said secondary coating composition coated on said optical fibers and at least substantially completely curing of said secondary coating composition; and
encapsulating said plurality of optical fibers having said primary coating layer and said secondary coating layer thereon with a matrix material, said encapsulation being conducted while said secondary coating composition is at least substantially completely cured whereby said matrix material and said secondary coating are adjoining but substantially unreacted with each other.

27. The optical fiber ribbon according to claim 26, wherein said optical fiber ribbon is resistant to stresses that pinch the ribbon edge-to-edge, and said matrix material does not debond from said plurality of fibers.

28. The optical fiber ribbon according to claim 26, wherein said optical fiber ribbon is resistant to stresses that pinch the ribbon edge-to-edge, and said optical fiber ribbon may be subjected to a twist of 720 degrees over a length of 6 inches without debonding said matrix material from said plurality of fibers.

* * * * *